(12) United States Patent
Ichioka (10) Patent No.: US 6,809,747 B1
(45) Date of Patent: Oct. 26, 2004

(54) TRANSMITTING AND RECEIVING A SIGNAL OF A PICTURE INCLUDING RELATED INFORMATION

(75) Inventor: Hidetoshi Ichioka, Kanagawa (JP)

(73) Assignee: Sony Corporation, Tokyo (JP)

( * ) Notice: Subject to any disclaimer, the term of this patent is extended or adjusted under 35 U.S.C. 154(b) by 338 days.

(21) Appl. No.: 09/587,589

(22) Filed: Jun. 2, 2000

(30) Foreign Application Priority Data

Jun. 3, 1999 (JP) .......................................... 11-157021

(51) Int. Cl.$^7$ .............................................. G09G 5/00
(52) U.S. Cl. ....................... 345/700; 345/717; 345/767; 345/961
(58) Field of Search ................................ 345/700, 717, 345/723, 748–749, 757, 764, 767, 810, 835, 846, 848–852, 961, 671; 348/473–474, 563–565, 460–468

(56) References Cited

U.S. PATENT DOCUMENTS

| | | | | |
|---|---|---|---|---|
| 5,819,003 A | * | 10/1998 | Hirayama et al. | ............ 386/95 |
| 5,966,121 A | * | 10/1999 | Hubbell et al. | ............. 345/726 |
| 5,990,941 A | * | 11/1999 | Jackson et al. | ........ 348/207.99 |
| 6,144,375 A | * | 11/2000 | Jain et al. | ................ 715/500.1 |
| 6,154,771 A | * | 11/2000 | Rangan et al. | .............. 709/217 |
| 6,288,702 B1 | * | 9/2001 | Tachibana et al. | .......... 345/671 |
| 6,304,855 B1 | * | 10/2001 | Burke | ......................... 705/27 |
| 6,360,029 B1 | * | 3/2002 | Moller | ....................... 382/298 |
| 6,388,684 B1 | * | 5/2002 | Iwamura et al. | ............ 345/788 |
| 6,445,398 B1 | * | 9/2002 | Gerba et al. | ................ 345/721 |

* cited by examiner

*Primary Examiner*—Sy D. Luu
(74) *Attorney, Agent, or Firm*—Frommer Lawrence & Haug LLP; William S. Frommer; Hans R. Mahr (57) ABSTRACT

For an interactive operation with a receiver which receives unidirectionally broadcast data, a signal of a picture including an object are multiplexed with information relevant to the object with a visible symbol to which reference is made when selecting the object, being presented in the picture correspondingly to the object. The relevant information is transmitted by a unidirectional broadcasting system in which the information is displayed when the object is selected referring to the symbol. The relevant information is displayed by making a selection between a channel from a first tuber (2) and a one from a second tuner (3) by means of a remote controller (1) with reference to the symbol corresponding to the object displayed on a color CRT (7).

13 Claims, 5 Drawing Sheets

(DISPLAY OF PROFILE)

FIG.5B

TRANSMITTING AND RECEIVING A SIGNAL OF A PICTURE INCLUDING RELATED INFORMATION

BACKGROUND OF THE INVENTION

1. Field of the Invention

The present invention relates to a method of transmitting a multiplexed picture signal, and an apparatus for and method of receiving a multiplexed picture signal.

2. Description of the Related Art

Along with the recent progress of the digital processing and transmission of a television signal, developments have actively been made to provide multifunction TV receivers. The functions of such TV receivers include reception and display of multiplexed television signal carrying character information. If many channels can be transmitted via a digital cable network or communication satellite broadcasting, it will be possible for the TV audience to enjoy contents of a program, associated with each other, on difference channels. For example, in a sports program, pictures taken from different camera angles can be broadcast simultaneously on a plurality of channels.

The character broadcasting (teletext) and multichannel broadcasting will give the audience a wider choice of programs, and allow a TV receiver to have an added value called "interactivity" although the broadcasting is of course unidirectional. With the above-mentioned multichannel TV system, when the TV audience is interested in an actor or actress, for example, playing in a drama on a TV channel, displayed on the TV screen, he or she can designate the actor or actress, by pointing or by any other way, for access to the actor's personal information given by characters displayed on the TV screen, or designate an accessory or ornament the actor wears for displaying another TV channel associated with the drama channel and on which shopping information related to the accessory is being broadcast.

On the other hand, the multimedia and hypermedia information coding experts group (MHEG) for standardization of the synchronous multiplexing method, control and format of the multimedia and the Internet television system for broadcasting a picture signal via the Internet network, has implemented the interactivity with the multimedia and Internet TV system by the object data transmission and bidirectional communications, respectively.

However, the conventional character broadcasting and multichannel broadcasting cannot be operated with a direct reflection of an audience's interest as mentioned above since they have no direct relation with a picture signal, especially, selectable objects carried on the picture signal. The character information includes for example stock market information, news, shopping information, etc. The contents of such information are not directly relevant to the picture signal. The plot and caption of a program can only be displayed or not displayed, which is not any interactivity. In the multichannel broadcasting, a desired channel can be selected by switching through a plurality of channels as in the ordinary TV channel selection. This is not any interactive operation in connection with the contents of a program being viewed on the TV screen.

On the other hand, even with the interactivity implemented by the Internet television system and the bidirectional communications and object data transmission defined by the MHEG, it is difficult to make a controllable content of a variable-shape object moving in a moving picture on the TV screen. The data in this field has a format not compatible with data in the ordinary broadcasting, and so it cannot be received by the conventional TV receiver.

Even if such a content can be made and received by the conventional TV receiver, the TV audience has to locate an object moving in a picture using a keyboard or cursor key. The locating operation will be complicated.

OBJECT AND SUMMARY OF THE INVENTION

Accordingly, the present invention has an object to overcome the above-mentioned drawbacks of the prior art by providing a method of transmitting a picture signal in a multiplexed data format in which relevant information can be appended to a selectable variable-shape object in a moving picture, and a receiving apparatus and method, adapted to display information relevant to a selected object in an interactive manner by a simple operation and appropriate feedback.

The above object can be attained by providing a transmitting method including, according to the present invention, steps of:

multiplexing a signal of a picture including a selectable object, with information relevant to the selectable object in the picture, with a visible symbol to which reference is made when selecting the selectable object, being presented in the picture correspondingly to the selectable object; and transmitting the multiplexed picture signal;

the relevant information being displayed by selecting the selectable object referring to the symbol.

Also, the above object also be attained by providing a receiver for receiving a picture signal multiplexed with information relevant to a selectable object included in a picture and which have presented in the picture a visible symbol corresponding to the selectable signal, the apparatus including according to the present invention:

means for displaying the picture of the received picture signal;

an input means for receiving the symbol corresponding to the selected object; and means for controlling the displaying means to display the information relevant to the selected object correspondingly to the symbol received by the input means.

Also the above object can be attained by providing a receiving method of receiving a picture signal multiplexed with information relevant to a selectable object included in a picture and which have presented in the picture a visible symbol corresponding to the selectable signal, the method including, according to the present invention, steps of:

displaying the picture of the received picture signal; and controlling for the displaying means to display the information relevant to the selected object correspondingly to the received symbol.

As having been described in the foregoing, the present invention provides the transmitting method in which a signal of a picture are multiplexed with information relevant to a selectable object included in the picture and the picture signal thus multiplexed are transmitted. Also the present invention provides the receiver and receiving method in which a signal of a picture, multiplexed with information relevant to a selectable object included in the picture are received and a control is made to display the information relevant to the selected object correspondingly to a symbol included in the received picture.

According to the present invention, a character information or a picture on another channel may selectively be displayed as the information relevant to a selectable object standing still or moving in the picture signal.

Also, according to the present invention, when the relevant information is displayed, the position of the selected object can be fed back under the zooming effect to inform the TV audience of the relation of the relevant information to a picture being displayed.

Further, according to the present invention, the display position and content of the object can hourly be changed correspondingly to a movement of the object.

Moreover, according to the present invention, picture data can be displayed on a conventional TV receiver since the data form is interchangeable with the conventional one.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
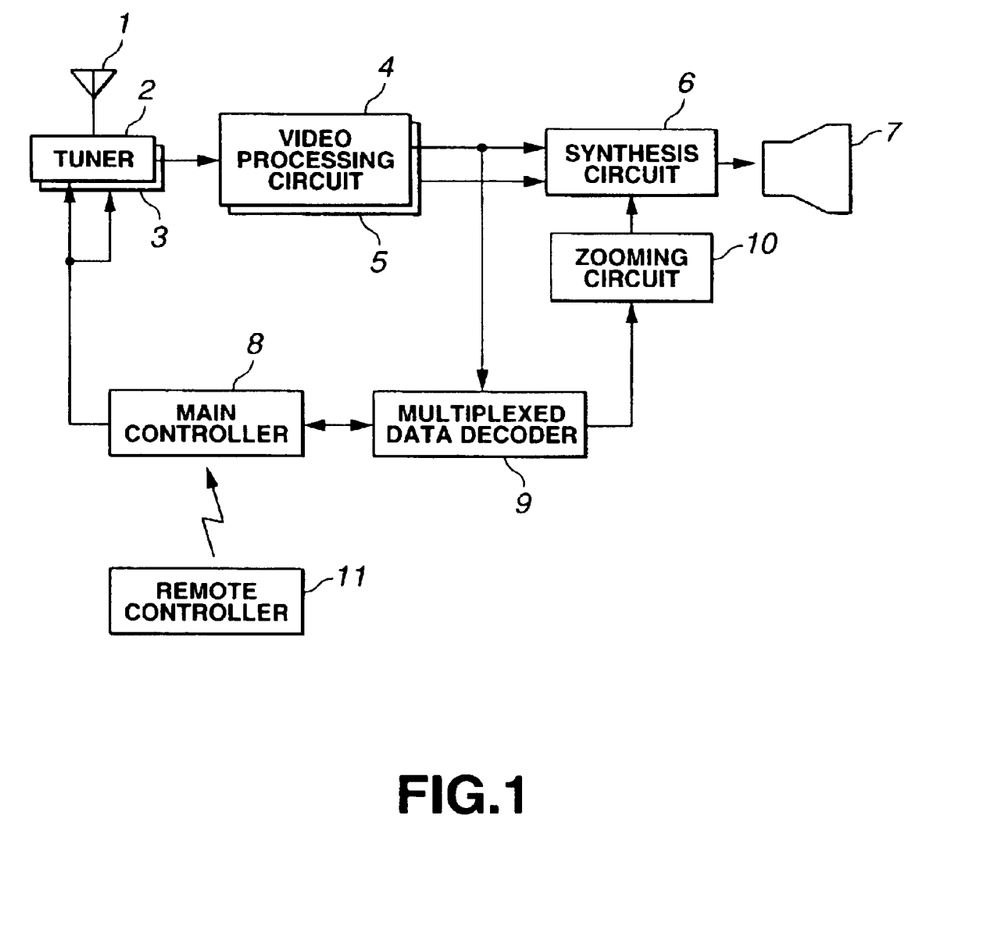
FIG. 1 is block diagram of a television receiver capable of receiving multiplexed data.

Referring now to FIG. 1, there is illustrated in the form of a block diagram a TV receiver capable of receiving multiplexed data, which is an embodiment of the present invention.

As shown in FIG. 1, the TV receiver includes an antenna 1 to detect a signal from a broadcast electromagnetic wave of a radio frequency, first and second tuners 2 and 3 to select a picture signal from the radio frequency signals from the antenna 1 by tuning and detection (demodulation), and first and second video processing circuits 4 and 5 to process the picture signal from the first and second tuners 2 and 3, respectively.

The TV receiver further includes a multiplexed data decoder 9 to extract multiplexed information from the output from the first video processing circuit 4, a zooming circuit 10 to generate data for zooming based on the output from the multiplexed data decoder 9, and a synthesis circuit 6 to combine the output from the first video processing circuit 4 and/or second video processing circuit 5 based on the data from the zooming circuit 10.

Furthermore, the TV receiver includes a color cathode ray tube (CRT) 7 to display the output from the synthesis circuit 6, main controller 8 to control each component of the TV receiver, and a remote controller 11 for remote control of the main controller 8.

The antenna 1 detects a broadcast signal of radio frequency and sends it to the first and second tuners 2 and 3. The first and second tuners 2 and 3 tune and demodulate the radio frequency signal detected by the antenna 1 and select a picture signal. The first and second video processing circuits 4 and 5 process the signals supplied from the first and second tuners 2 and 3, respectively, and provide the processed signals as digital signals.

Based on the data from the zooming circuit 10, the synthesis circuit 5 combines the digital signals from the first video processing circuit 4 and/or second video processing circuit 5, respectively, and convert the synthesized signal to an analog signal for supply to the color CRT 7. The color CRT 7 display the analog output from the synthesis circuit 5 as an image in colors.

Since the TV receiver incorporates at least two, main and sub, systems each of a tuner and video processing circuit, namely, the first and second tubers 2 and 3, and the first and second video processing circuits 4 and 5, it can provide a display of a window in a picture being displayed The first tuner 2 and first video processing circuit 4 form together the main system, while the second tuner 3 and second video processing circuit 5 form together the sub system.

The output picture signal from the first video processing circuit 4 of the first system is supplied to the multiplexed data decoder 9 as well. The multiplexed data decoder 9 can extract, for processing, multiplexed information superposed on the vertical blanking period for example. The multiplexed data decoder 9 operates according to a command from the main controller 8. The multiplexed data decoder 9 analyzes multiplexed information and judges whether the multiplexed information is character information or a channel number. The subsequent processing which will be done when the multiplexed information is judged to be a character information and that when the multiplexed information is judged to a channel number, will be described herebelow.

When the multiplexed information is a channel number, the multiplexed data decoder 9 sends the channel number to the main controller 8 which will select a channel including the second tuner 3 belonging to the sub system. At the same time, the multiplexed data decoder 9 sends information such as an address to the zooming circuit 10. The zooming circuit 10 determines a zooming position and zoomed display size using the address, clock information, etc. and supplies them to the synthesis circuit 6. The synthesis circuit 6 generates a zoomed image from a picture signal from the second video processing circuit 5 and combines it with a main picture from the first video processing circuit 4. For example, this zooming is adopted to zoom a picture on a channel number newly selected.

For example, the synthesis circuit 6 can zoom in, within a picture on the first channel from the first video processing circuit 4, other picture on the second channel from the second video processing circuit 5, starting at the zooming position up to the zoomed display size.

Note that the synthesis circuit 6 can zoom in, within a picture on the first channel from the first video processing circuit 4, other multiplexed information on the first channel from the first video processing circuit 4, starting at the zooming position up to the zoomed display size. In this case, no picture from the second video processing circuit 5 is necessary.

When the multiplexed information is character information, the multiplexed data decoder 9 sends content and address of the character information to the zooming circuit 10. The zooming circuit 10 generates a window containing the character information, and supplies it along with a zooming start position and zoomed display size determined using the address and clock information to the synthesis circuit 6. The synthesis circuit 6 generates a zoomed image of the window containing the character information and combines it with the main picture from the first video processing circuit 4.

The synthesis circuit 6 receives one or two input picture data, display position and display size to provide a synthetic picture. Thereby, it is possible to combine and display the image with character information and picture from the other channel while changing the size little by little. Also, since an address can be set per frame, the zooming position, window position, display size, etc. can be changed appropriately for the picture. Further, since an object selectable for an entire picture is uniquely identified by an ID number, information relevant to the object can automatically be displayed when the same object is displayed in a subsequent scene.

In the TV receiver, the main controller 8 controls the channel selection according to a channel control from the remote controller 11 when the TV receiver is in an ordinary operation. However, when the main controller 8 is in a "select mode" and the user presses a channel number select button on the remote controller 11, that is, one of numeric keys used as the channel number select buttons, the main controller 8 will send a corresponding channel number to the multiplexed data decoder 9 without control on the selection between the tuner channels.

The "select mode" of the main controller 8 is valid when it is informed from the multiplexed data decoder 9 that an object is being displayed. Otherwise, the "select mode" can be made valid or invalid through direct change of the setting of the main controller 8 by the user.

In the "select mode", the channel number keys on the remote controller 11 are used as numeric keys to designate symbols for selection of a selectable object.

Figure 2:
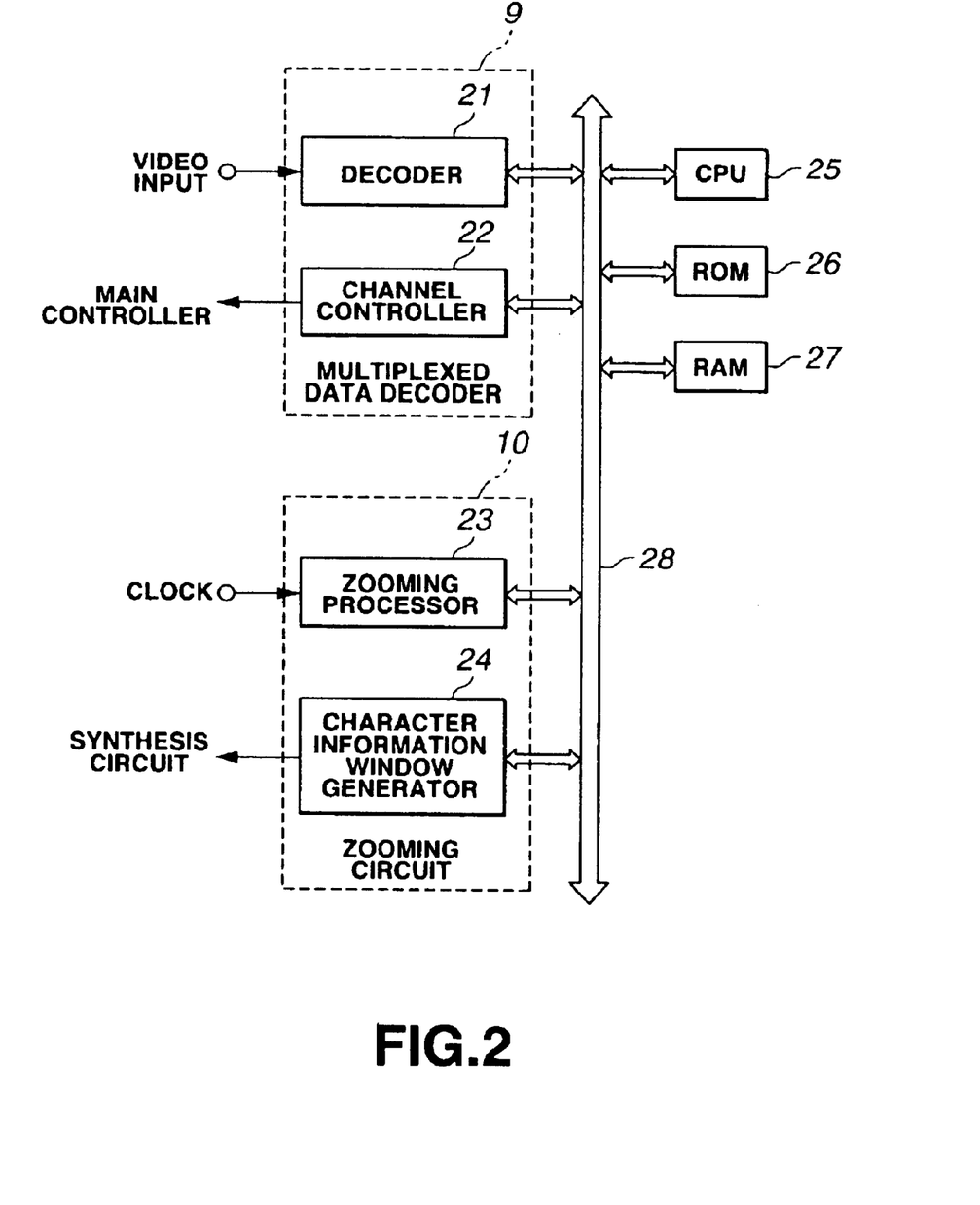
FIG. 2 is a block diagram of a circuit portion of the TV receiver, including a multiplexed data decoder and zooming circuit.

FIG. 2 shows in the form of a block diagram a circuit portion of the TV receiver, including the multiplexed data decoder 9 and zooming circuit 10.

As shown, the multiplexed data decoder 9 includes a decoder 21 to decode a signal from the first video processing circuit 4 in the main system, and a channel controller 22 to control channels of the main controller 8. The zooming circuit 10 includes a zooming processor 23 to make a zooming operation based on a clock input, and a character information window generator 24 to generate character information and/or window and send them to the synthesis circuit 6.

The decoder 21 and channel controller 22 in the multiplexed data decoder 9 are connected to a control bus 28 to which the zooming processor 23 and character information window generator 24 in the zooming circuit 10 are also connected.

In the above circuit portion of the TV receiver, there are also provided a central processing unit (CPU) 25, read-only memory (ROM) 26 which is a non-volatile memory, and a random-access memory (RAM) 27 which is a volatile memory. The CPU 25, ROM 26 and RAM 27 are also connected to the control bus 28 as shown.

The multiplexed data decoder 9 has a picture input to which supplied are a picture signal, multiplexed with at least information relevant to the picture. The supplied picture signal are passed to the decoder 21 in the multiplexed data decoder 9. The decoder 21 separates the information multiplexed with the picture signal. The information thus separated is stored into the RAM 27.

Figure 3:
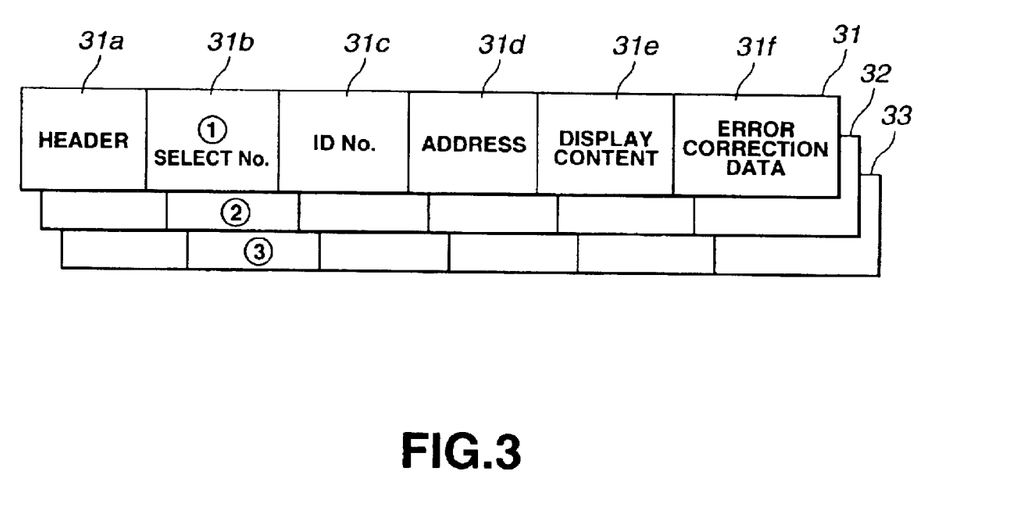
FIG. 3 shows a form example in which data are superposed on one another.

FIG. 3 shows a form example in which data are superposed on one another. This form is taken by a signal for storage into the RAM 27 of the multiplexed data decoder 9. A picture data is multiplexed with ID and/or display content of an selectable object.

As shown, a first data 31 in the form includes a header 31a, error correction data 31f, and in addition, a select No. part 31b, ID No. part 31c, address part 31d and a display content part 31e corresponding to channel numbers as having been described above. These data parts are taken as one set, and the same number of such sets as selectable objects in one screen are stored in the RAM 27. It is assumed herein that there exist three selectable objects in one screen. So, there are three data including the first data 31, second data 32 and third data 33.

When the display data part 31e shows a channel number different from a one in the select No. part 31b, information of this fact is passed to the channel controller 22 which will thus select the channel for the second tuber 3 in the sub system via the main controller 8. Note that as aforementioned, the first tuner 2 in the main system corresponds to the channel number shown in the select No. part 31b. The display content part 31e shows character information as the case may be.

A broadcast data is assumed herein to contain a picture part having symbols indicative of the existence of relevant information including numeric keys in at least a picture signal, and a multiplexed data part having the select No. part 31b, ID No. part 31c, address part 31d and display content part 31e multiplexed on a data channel independent of the picture part. Note that more than one address part 31d may be included in the data form.

The zooming processor 23 is provided to determine a zoomed display start position from the "address" in the RAM 27, and calculates a maximum display size from the "display content". When the "display content" shows a channel number, the maximum display size will normally be the entire screen size. When the "display content" shows character information, vertical and horizontal lengths of display window are derived from a number of characters, etc.

A zoomed display window size is determined from the maximum display size determined as in the above and time information acquired from the clock. As the zooming ratio is varied correspondingly to the time information, the window will be enlarged little by little, which is the zooming effect. The character information window generator 24 generates a character information window which will actually be displayed.

FIG. 4 shows examples of display on this embodiment of the TV receiver. In a picture 51 in FIG. 4A displayed on the color CRT 7 of the TV receiver, there are shown an actress 52, handbag 53 held by the actress 52 and a caption "To other camera angle" 54. Numeric keys (1), (2) and (3) for example in the picture 51A correspond to numeric keys provided on the remote controller 11 for selection of selectable objects at which the numeric keys point, respectively. In this example, the numeric key (1) points to the handbag 53, the numeric key (2) points at the actress 52, and the numeric key (3) points to the caption 54. These numeric keys shown in the picture inform the user that there are available information relevant to the handbag 53, actress 52 and caption 54, respectively.

Figure 4A:
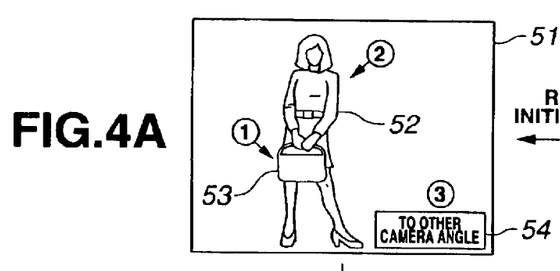
FIG. 4 shows examples of display on the TV receiver.
Figure 4B:
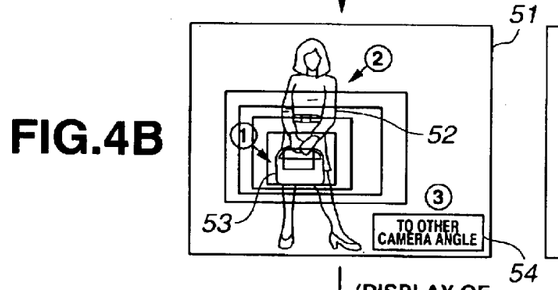
Figure 4C:
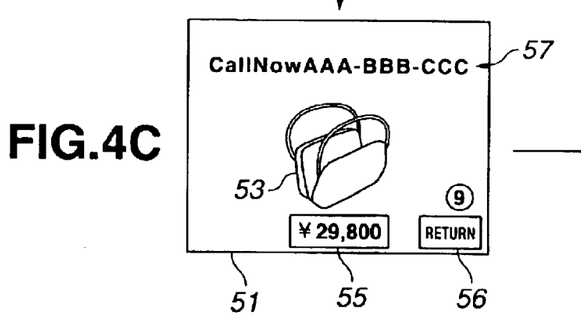
Figure 4D:
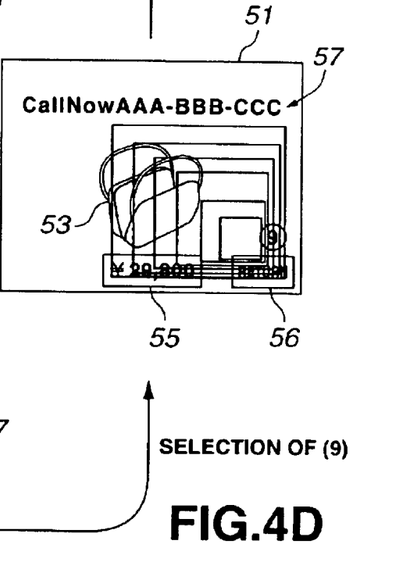

When the user selects the numeric key (1) for example in the picture 51 in FIG. 4A by pressing the numeric key provided on the remote controller 11, the handbag 53 on an associated other channel will be displayed while being zoomed in little by little under the zooming effect as shown in a picture 51 in FIG. 4C, starting at the position of the handbag 53 in a picture 51 in FIG. 4B (also in the picture 51 in FIG. 4A). In FIG. 4, the picture 51 in FIG. 4C shows shopping information of the handbag 53, being broadcast on the associated other channel.

The picture 51 in FIG. 4C shows the handbag 53, line of characters "Call Now AAA-BBB-CCC" 57 and a caption "Return" 56. In this picture 51 in FIG. 4C, a numeric key (9) is also displayed pointing at the caption "Return" 56. When the user presses a corresponding numeral key on the remote controller 11 at any time, he can go back to the initial channel, namely, to the picture 51 in FIG. 4D. At this time, as shown in a picture 51 in FIG. 4D, the picture on the initial channel shown in the picture 51 in FIG. 4A is displayed as zoomed starting at the display position of the caption "Return" 56 as in the picture 51 in FIG. 4C.

Similarly, when the numeric key (3) pointing at the caption "To other camera angle" 54 is selected in the picture 51 in FIG. 4A by operating the remote controller 11, a picture taken from another camera angle and broadcast on another channel will be displayed while being zoomed.

Figure 5A:
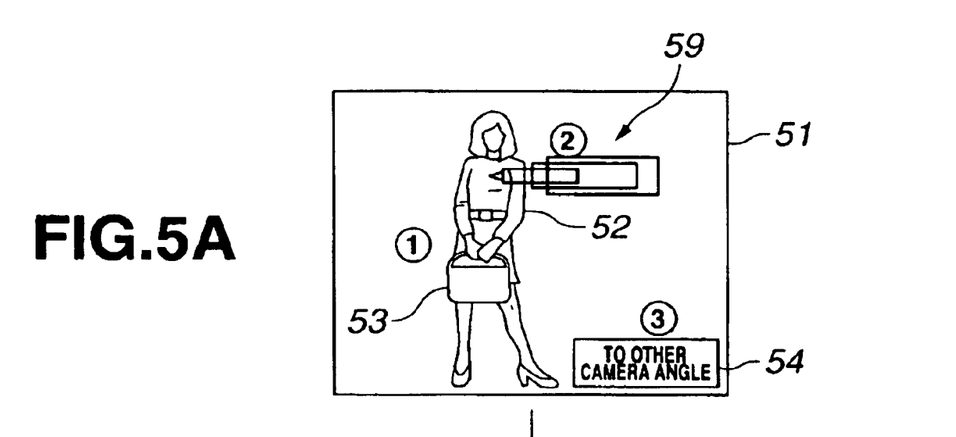
FIG. 5 also shows examples of display on the TV receiver.
Figure 5B:
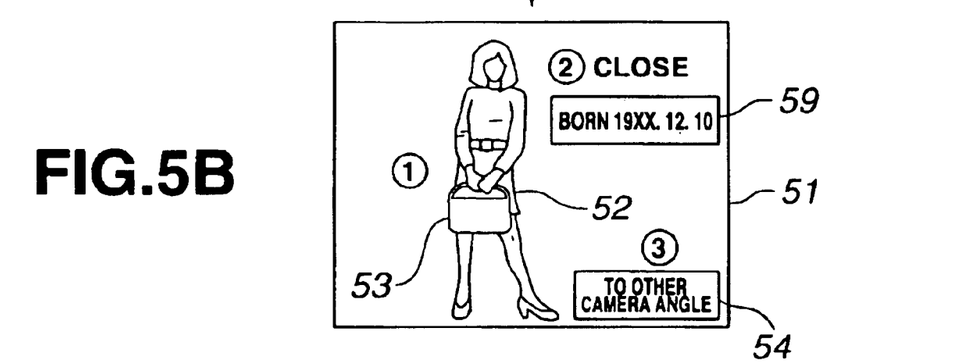

FIG. 5 also shows examples of display on the TV receiver. When the numeric key (2) pointing to the actress 52 in the picture 51 in FIG. 4A is selected by pressing a corresponding numeric key on the remote controller 11, a character information window 59 including the profile, etc. of the actress 52 is opened while being zoomed in, as seen in a picture 51 in FIG. 5A. The information window 59 opened as zoomed starting with the picture 51 in FIG. 4E, which is shown in a picture 51 in FIG. 5B, can be closed while being zoomed out, by selecting a numeric key (2) pointing at a caption "Close" in the picture 51 in FIG. 5B by pressing a corresponding numeric key on the remote controller 11 according to an instruction displayed on the screen. As shown, the zooming start position and zooming end position can be set independently of each other, so that the window will not hide a main object, the actress 52 in this case. Namely, the information window can be opened at a position where it will not overlap the zooming start position in the picture in FIG. 5A. In this case, the address part 31d in FIG. 3 includes two sets of address.

Normally, the numeric keys appearing in a picture and corresponding to information relative to selectable objects are displayed near the objects, respectively, and suggest that the objects are selectable. A numeric key in the select No. part 31b corresponds one-to-one to a numeric key for an relevant information, in a picture being displayed. A numeric key in the select No. part 31b corresponds to a picture being displayed. A number in the ID No. part 31c is a serial number for unique identification of each object in the whole picture. Numeric values in the address part 31d show one or more positions or addresses where numeric keys for relevant information appear in the picture. Data in the display content part 31e are those such as associated channel numbers and character information.

The above multiplexed data are, for example, numeric keys multiplexed for each synthesized frame and provide means for identifying a moving object with a numeric key.

As having been described in the foregoing, the embodiment of the TV receiver according to the present invention includes the receiving unit to receive a transmitted signal including at least a picture signal, the multiplexed data decoder 9 to separate, for decoding, the select No. part 31b, ID No. part 31c, address part 31d and display content part 31e corresponding to relevant information indicated with numeric keys in the picture signal and transmitted as multiplexed data channels independent of the picture signal, and the synthesis circuit 6 to synthesize a desired display content in an arbitrary side at an appropriate address and display it along with a picture. The receiving unit includes, for example, the antenna 1, first and second tuners 2 and 3, and first and second video processing circuits 4 and 5.

In this embodiment, the multiplexed data decoder 9 includes a storage means for storing the select No. part 31b, ID No. part 31c, address part 31d, and channel numbers and character information in the display content part 31e, and a storage means for comparing a numeric key supplied from the remote controller 11 with a numeric key in the select No. part 31b to identify an object at which the numeric key points, and storing the ID No. part 31c.

The synthesis circuit 6 has a zooming function to display a picture or character information to be displayed at a predetermined address so that it is zoomed in gradually at a certain address and close a picture or a character information window being displayed, so that it is zoomed out little by little to a certain address. In this embodiment, more than one address part 31d may be set to provide zooming start position and zooming end position which are different from each other. Thereby, character information, etc. can be displayed so as not to overlap any important person or other in a picture. Also, a selection once made can be canceled by pressing any button or other on the remote controller 11 in the course of zooming.

With the above-mentioned construction of the TV receiver according to the present invention, information relevant to a selected one of the selectable objects appearing in a picture displayed on the TV screen can be displayed on the screen by selecting the object via a predetermine input by the user. Owing to the zooming effect, the position of the selected object and relevant information can be zoomed in for feedback to the user.

With this embodiment, by pressing a numeric key on the remote controller 11, the user can easily know a portion of the picture with which a corresponding numeric key in the picture is related, since the portion is displayed as zoomed in.

Next, the transmitter to transmit a multiplexed picture signal which are to be received by the aforementioned TV receiver will be described herebelow. The transmitting method includes steps of multiplexing information relevant to a selectable object appearing in an picture with the picture signal, and transmitting the multiplexed picture signal.

This multiplexing is such that a data as shown in FIG. 3 above is multiplexed for the vertical blanking period of the picture signal. The reception is such that the multiplexed data is modulated in a predetermined form and transmitted with a radio frequency for example.

It is suggested by a symbol selectively entered by the user that a relevant information multiplexed with the picture signal is available. The symbols is visibly shown in the picture. The relevant information contains ID information and/or display content of the object. The display content includes a display content of the picture and channel number selected by the user.

The relevant information further includes an address of the object. The picture can be zoomed in starting at the address. By interrupting the zooming once started, two pictures can be displayed simultaneously with one within the other.

As having been described in the foregoing, the embodiment is adapted to multiplex, with a selected object appearing in a picture, a picture signal made by synthesis of a numeric key and symbol corresponding to relevant information and a data signal intended for use to make an interactive operation of the TV receiver.

In the above-mentioned embodiment, the numeric key is buried in the picture. However, with a special key provided on the remote controller 11, a symbol can be used for the numeric key.

What is claimed is:

1. A transmitting method comprising steps of:

multiplexing a signal of a picture including a selectable object with information relevant to the selectable object in the picture; and transmitting the multiplexed picture signal;

wherein a visible symbol to which reference is made when selecting the selectable object is presented in the picture corresponding to the selectable object, the relevant information indicates display content, a zooming start position, and a zooming end position, and when the selectable object is selected by referring to the symbol, the display content is displayed on a screen by zooming in according to the zooming start position and the zooming end position.

2. The method as set forth in claim 1, wherein the relevant information includes an identification information for unique identification of the selectable object.

3. The method as set forth in claim 1, wherein the display content is character data describing the selectable object.

4. The method as set forth in claim 1, wherein:

one or more channels carrying information relevant to the selectable object are used for the signal of the picture including the selectable object; and the information channels are selected by entering, by select keys of an input means, a symbol of a channel number with which reference is made to the channels.

5. The method as set forth in claim 1, wherein the relevant information includes an address indicating a start point of a picture data zooming by which within a picture, another picture is gradually zoomed in to display the display content.

6. The method as set forth in claim 5, further comprising a step of:

interrupting the zoom of the another picture to simultaneously display both the picture and the another picture.

7. The method as set forth in claim 1, wherein the relevant information indicates a zoomed display size and the display content is displayed according to the zoomed display size.

8. A receiver for receiving a picture signal of a picture multiplexed with information relevant to a selectable object included in the picture and presenting in the picture a visible symbol corresponding to the selectable object, the apparatus comprising:

means for displaying the picture of the received picture signal including at least one selectable object and displaying a visible symbol for each selectable object;

an input means for receiving a selection indicating a visible symbol corresponding to a selectable object; and means for controlling the displaying means to display display content indicated by the relevant information corresponding to the selectable object indicated by the selection received by the input means, wherein the relevant information for a selectable object indicates display content, a zooming start position, and a zooming end position, and the controlling means controls the display means to display the display content on a screen by zooming in according to the zooming start position and the zooming end position.

9. The receiver as set forth in claim 8, wherein the relevant information includes an address indicating the zooming start position.

10. The receiver as set forth in claim 8, wherein the relevant information indicates a zoomed display size and the display content is displayed according to the zoomed display size.

11. A receiving method of receiving a picture signal of a picture multiplexed with information relevant to a selectable object in the picture and presenting in the picture a visible symbol corresponding to the selectable object, the method comprising steps of:

displaying the picture of the received picture signal including at least one selectable object;

displaying a visible symbol for each selectable object;

receiving a selection indicating a visible symbol corresponding to a selectable object; and controlling displaying to display display content indicated by the relevant information corresponding to the selectable object indicated by the received selection, wherein the relevant information indicates the display content, a zooming start position, and a zooming end position, and the controlling displaying includes controlling displaying to display the display content on a screen by zooming in according to the zooming start position and the zooming end position.

12. The method as set forth in claim 11, wherein the relevant information includes an address indicating the zooming start position.

13. The method as set forth in claim 11, wherein the relevant information indicates a zoomed display size and the display content is displayed according to the zoomed display size.

* * * * *